(12) United States Patent
Hawkins

(10) Patent No.: US 8,005,923 B2
(45) Date of Patent: Aug. 23, 2011

(54) SYSTEM AND METHOD OF OBFUSCATING QUEUE MANAGEMENT

(75) Inventor: John Christopher Hawkins, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 12/390,772

(22) Filed: Feb. 23, 2009

(65) Prior Publication Data
US 2010/0217807 A1 Aug. 26, 2010

(51) Int. Cl.
*G06F 15/16* (2006.01)
(52) U.S. Cl. .................. 709/217; 709/236; 709/246
(58) Field of Classification Search .......... 709/201–207, 709/217–248
See application file for complete search history.

(56) References Cited

U.S. PATENT DOCUMENTS

| | | | | |
|---|---|---|---|---|
| 6,336,135 | B1 * | 1/2002 | Niblett et al. | 709/215 |
| 7,043,633 | B1 * | 5/2006 | Fink et al. | 713/162 |
| 7,496,926 | B2 * | 2/2009 | Majumdar | 719/315 |
| 7,590,696 | B1 * | 9/2009 | Odell et al. | 709/206 |
| 2004/0024880 | A1 | 2/2004 | Elving et al. | |
| 2005/0076089 | A1 * | 4/2005 | Fonseca | 709/206 |
| 2005/0114453 | A1 * | 5/2005 | Hardt | 709/206 |
| 2006/0168052 | A1 * | 7/2006 | Srinivasan et al. | 709/206 |
| 2008/0235336 | A1 * | 9/2008 | Stern et al. | 709/206 |

OTHER PUBLICATIONS

Network Security Mechanisms Utilizing Dynamic Network Address Translation, SAND 2002-3613, Unlimited Release, Printed Nov. 2002.

* cited by examiner

*Primary Examiner* — Yasin Barqadle
(74) *Attorney, Agent, or Firm* — Scully, Scott, Murphy & Presser, P.C.; Jeanine S. Ray, Esq.

(57) ABSTRACT

The present invention is generally directed to a method, system, and article of manufacture that avoid exposing the sensitive information (e.g., infrastructure details) to untrusted clients. For example, in one embodiment of the present invention, message destinations are protected from a client in an HTTP bridged scenario. Thus, according to one embodiment of the present invention, the replyTo message destination are obfuscated (e.g., via a hash function) and sent to the client as a replyTo address. Consequently, the embodiments of the present invention negate the requirement to expose the sensitive information to the untrusted client applications.

15 Claims, 3 Drawing Sheets

SYSTEM AND METHOD OF OBFUSCATING QUEUE MANAGEMENT

FIELD OF THE INVENTION

The invention relates generally to a field of enterprise messaging. More specifically, this invention relates to a system and method of securely implementing a distributed and reliable communication system for clients connected to a messaging provider.

BACKGROUND OF THE INVENTION

As network functionality increases, it is becoming increasingly more important for systems to allow applications and application components to be distributed across networks (e.g., on multiple application servers). For applications and application components to be effectively distributed, various distributed parts of applications and application components (i.e. nodes) need to be able to communicate with each other. As used herein, a node may be a software component or process that runs on a common computer or different computers connected by a network or networks. Furthermore, a node may be a message producer and/or a consumer. Consequently, nodes may communicate with each other using messaging to exchange information. The information may be sent and received by nodes using only a predetermined message format and a destination address for the message. The predetermined message format may include a message header for message identification, a properties section for application-specific, provider-specific, optional header fields—e.g., a "replyTo" header field to indicate the origin of the message for call back messages—and a body section that contains the content of the message. Moreover, the content of a message may include text, data packets, objects, or other information to be communicated between nodes.

As used in the context below, a "message" is a unit of information transmitted electronically from one computer application to another. Examples of messages generally include email messages and messages in data communications protocols such as HTTP or TCP/IP. Many messages in embodiments according to the present invention are units of information communicated in message oriented middleware (hereinafter referred to as "MOM") framework (or system of software components and conventions that provide a message-oriented middleware architecture and features; see generally Chappell, "Enterprise Message Bus", O'Reilly (2004)). MOM messages differ somewhat from many other kinds of messages. Email messages, for example, implement human-readable communications from a person to a person or from a software application to a person. HTTP messages represent requests for particular computer resources and responses to such requests. MOM messages, however, are used for communications between software applications and other software applications to implement business logic. That is, a MOM message generally communicates input data for, or output data from, operation of some form of business logic, accounting, on-line sales or marketing, financial calculations, security services, and so on. Examples of MOM systems include IBM's WebSphere MQ products and the Java Message Service (hereinafter referred to as "JMS") Application Programming Interface (or "API").

Several different types of messaging systems may be used for communicating between nodes including point-to-point and publish-and-subscribe. As seen in FIG. 1a, in a point-to-point messaging system (generally, a one-to-one delivery system), a message 105 may be sent by a message producer 101 to a message consumer 103 through a message queue 110 (also known as a virtual channel). For example, a message producer 101 may send a message 105 to a message queue 110 for a message consumer 103. The message consumer 103 receives and processes the message 105 from the message queue 110.

As seen in FIG. 1b, in a publish-and-subscribe messaging system (generally a one-to-many broadcast), the message producer 101 may be a publisher for a topic 123 (also known as a virtual channel) that sends a message 115 to several message consumers (known as subscribers) that have subscribed to the topic 123. For example, the message producer 101 may send a message 115 to a topic 123. Several nodes, such as the message consumer 103 and the second message consumer 121 may subscribe (i.e., request that messages of a certain type be sent to the node when available) to the topic 123. The topic 123 may deliver the message 115 to the message consumer 103 and the second message consumer 121. Message consumers not subscribed to the topic do not receive the message.

To facilitate sending and receiving messages, nodes typically connect to a messaging agent for implementing message queues and/or topics. One example of a messaging agent may be implemented according to the JMS API. Messages may be sent and received asynchronously, and nodes sending and receiving messages do not typically need to know anything about the nodes they are communicating with. This allows more freedom between nodes and makes it easier to design interfaces between nodes and easier to distribute applications and application components across a network.

In addition, some network environments may utilize clustered systems. A clustered system may include nodes participating in a messaging system. Alternatively, a cluster may include multiple nodes that behave as a single node in the messaging system. For example, a node may be an application component and may use JMS to access MOM systems for messaging with other nodes in a network to form a distributed system. MOM systems support distributed data communications that are loosely coupled and generally asynchronous. A producer component sends a message to a destination (typically a message queue), and a consumer recipient can retrieve the message from the destination. The producer and the consumer are not required to be available, either on-line or connected to one another for data communications in order to communicate. In fact, the producer does not need to know anything about the consumer, nor does the consumer need to know anything about the producer. The producer and consumer need to know only what message format and what destination (or message queue) to use. In this respect, messaging differs from tightly coupled technologies, such as the Common Object Request Broker Architecture ("CORBA") or Java's Remote Method Invocation ("RMI"), which require a calling application to know a remote application's methods.

Consequently, a cluster of nodes may need to appear as a single producer/consumer for typical messaging systems. For example, confusion may result if two nodes in a cluster receive and process a topic message for which the cluster has subscribed to as a single entity. Also, it may be desirable for a cluster to support numerous different message-oriented middleware products.

In some environments, however, system operational requirements necessitate access to individual nodes (in a cluster or otherwise); for example, when a component expects a reply to a message that was sent. Consequently, within messaging in general, there is a messaging pattern such that a back-end application puts a message on a queue and sets a "replyTo" header that contains a specific Queue Manager (hereinafter referred to as "QM") name. The intention being that the client takes the message, processes it and then sends a response back to the specified location.

Thus, it becomes desirable to uniquely identify a single producer/consumer within a messaging system. Exposing infrastructure externally, however, may violate security policies. For example, some MOM providers have developed HTTP bridges (e.g., IBM's Websphere MQ) to allow messages to pierce a corporate firewall. An HTTP bridge allows an HTTP client to connect to the "bridge" (often implemented as an HTTP servlet in the Java™ 2 Enterprise Edition Application Programming Interface, or simply J2EE API) and the bridge connects to the MOM provider (e.g., IBM's WebSphere MQ) on behalf of the HTTP client. In order to scale appropriately, however, HTTP relies on horizontal scaling; namely, by replicating the HTTP server within the operating environment and each HTTP server may be situated on a different machine (see generally, Joines et al. *Performance analysis of Java Web Sites*, pp. 102-106, Addison-Wesley (2002). In tandem with this replication, an HTTP client is usually mapped one-to-one with a HTTP servlet, within the HTTP server, and QM of the MOM provider. To enable better response times, each QM may be on its own machine.

Additionally, within such a horizontally scaled environment, system designers frequently avoid exposing machine details to the clients to avoid direct communication with specific HTTP servers, QM's and therefore machines. In particular, there are potential security ramifications about exposing a QM name such that the clients can trawl the known QM names for queues that are not exposed through the bridged applications naturally, and therefore gain illicit access to the underlying computing device. Within the above specified bridging & horizontally scaled environment this would mean exposing the QM name to the client. This leads to excessive client knowledge, which may violate the security policies of network and potentially allow illicit access to the underlying computing devices.

BRIEF SUMMARY OF THE INVENTION

The present invention is generally directed to a method, system, and article of manufacture that avoid exposing the sensitive information (e.g., infrastructure details) to untrusted clients. For example, in one embodiment of the present invention, QM names are protected from a client in an HTTP bridged scenario. Thus, according to one embodiment of the present invention, a message destination identifier (e.g., a replyTo QM name and the Queue name together, in IBM's WebSphere MQ) are obfuscated (e.g., via a hash function) and sent to the client as a human-unrecognizable replyTo address. Consequently, the embodiments of the present invention negate the requirement to expose the sensitive information (e.g., QM or Queue names) to the untrusted client applications.

Therefore, one aspect of the present invention provides a computer-implemented method of managing message exchanges between a first computing device and a second computing device over a communications network, the method comprising:

intercepting a first message from the first computing device, transmitted to the second computing device over the communications network, where the first message includes a unique first identifier identifying the first computing device;

substituting the first identifier with a unique second identifier, which is different from the first identifier, in the first message before the first message is transmitted to the second computing device;

subsequently intercepting a second message from the second computing device, transmitted to the first computing device over the communications network, where the second message includes the second identifier; and substituting the second identifier with the first identifier before the second message is transmitted to the first computing device.

Another aspect of the present invention provides a system for managing message exchanges, comprising:

a communications network connecting a plurality of computing devices;

a first computing device connected to the communications network and adapted to send and receive messages;

a second computing device connected to the communications network and adapted to send and receive messages;

a third computing device connected to the communications network and including:

a means for intercepting a first message from the first computing device, transmitted to the second computing device, wherein the first message includes a unique first identifier identifying the first computing device;

a means for substituting the unique first identifier with a unique second identifier, which is different from the unique first identifier, in the first message before the first message is transmitted to the second computing device;

a means for subsequently intercepting a second message from the second computing device, wherein the unique second message includes the unique second identifier;

a means for substituting the unique second identifier with the unique first identifier before the second message is transmitted to the first computing device.

Yet another aspect of the present invention provides a computer-readable medium embodying computer-readable instructions, that when executed adapt a computing device to perform a method of managing message exchanges between a first computing device and a second computing device over a communications network, the method comprising:

intercepting a first message from the first computing device, transmitted to the second computing device over the communications network, where the first message includes a unique first identifier identifying the first computing device;

substituting the first identifier with a unique second identifier, which is different from the first identifier, in the first message before the first message is transmitted to the second computing device;

subsequently intercepting a second message from the second computing device, transmitted to the first computing device over the communications network, where the second message includes the unique second identifier; and substituting the unique second identifier with the unique first identifier before the second message is transmitted to the first computing device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The invention, as well as a preferred mode of use, further objects and advantages thereof, will best be understood by reference to the following detailed descriptions of illustrative embodiments when read in conjunction with the accompanying drawings. In each of the drawings below, as well as the respective descriptions, the same numbers are used throughout to reference like components and/or features.

DETAILED DESCRIPTION OF THE INVENTION

Figure 1A:
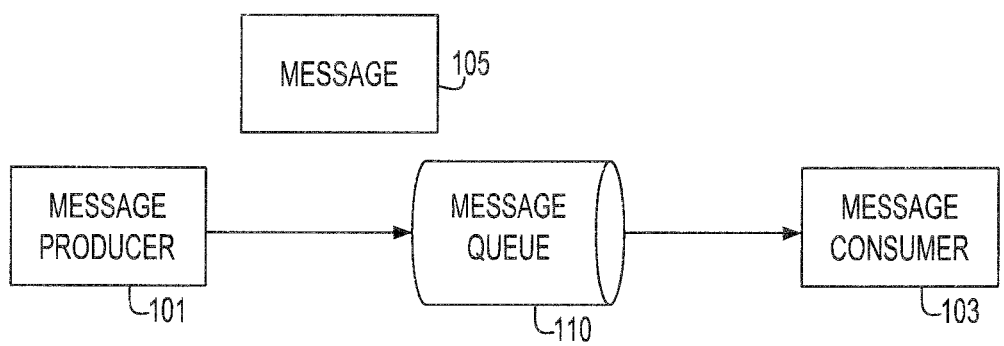
FIG. 1a illustrates a prior art example of a point-to-point messaging system.
Figure 1B:
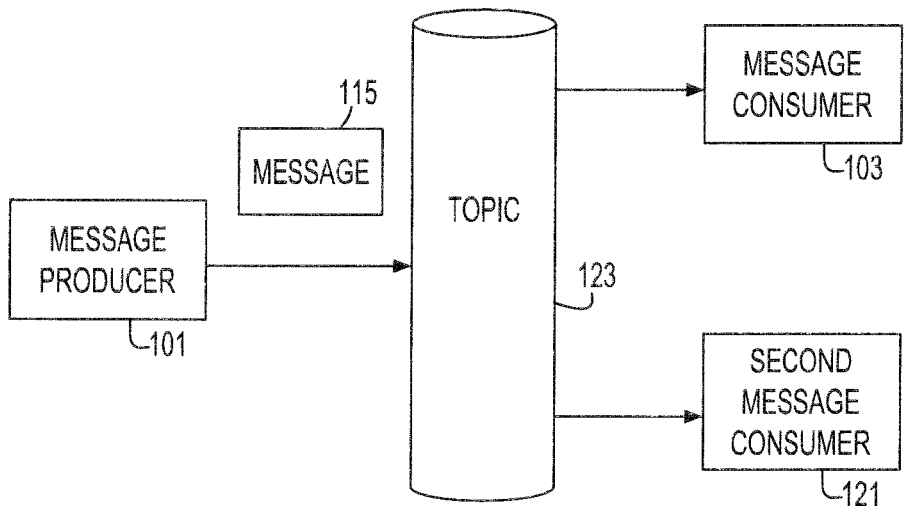
FIG. 1b illustrates a prior art example of a publish-and-subscribe messaging system.
Figure 2:
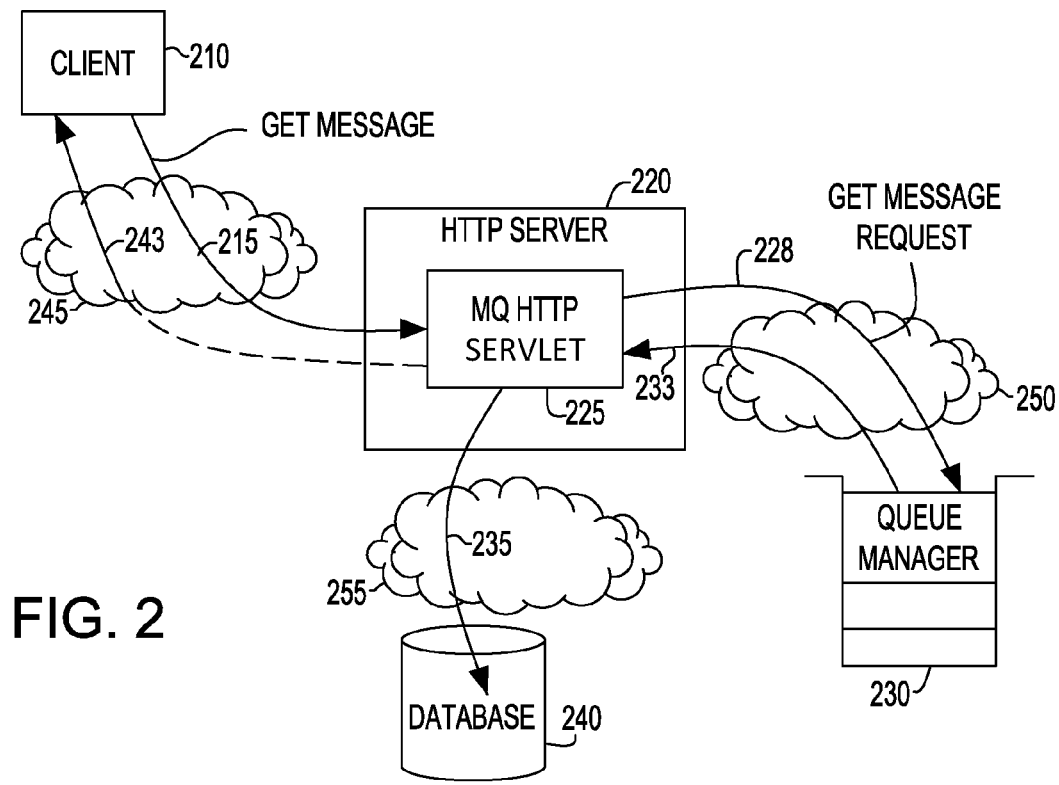
FIG. 2 is a schematic diagram of sending a message, with the reply to header field obfuscated, according to one embodiment of the present invention.

FIG. 2 illustrates obfuscating a "replyTo" header field in a message, according to one embodiment of the present invention. In FIG. 2, client 210 (a computing device, as described below) is an untrusted client and requests a message from server 220 (also a computing device, as described below). For example, client 210 may be an HTTP client, using the HTTP protocol, to send message request 215 to server 220, an HTTP server. As illustrated in FIG. 2, message request 215 from client 210 to server 220 is communicated over communications network 245. Communications network 245 may include any network allowing two or more computing devices to communication with each other. Example communications networks include, but are not limited to, the global Internet, corporate intranets, Ethernet, and other forms of Local Area Networks and Wide Area Networks. The medium of communication between the computing devices in communications network 245 may take various forms that include, but are not limited to, wired communications, wireless communications and satellite communications. In addition, communications network 245 may allow other forms of communication in conjunction with data communications—for example, communications network 245 may include voice communications.

In the embodiment shown in FIG. 2, server 220 includes message handler 225 to handle message requests from a client (e.g., message request 215). For example, message handler 225 may include an IBM's WebSphere MQ HTTP servlet to handle incoming message requests (e.g., message request 215) from clients using the HTTP protocol. Subsequently, in response to the message request from client 210, message handler 225 relays the message request (e.g., message request 228) from client 210 to message server 230.

Message server 230 then forms a message according to the appropriate messaging system, for example according to MOM framework such as IBM's WebSphere MQ, and includes a "replyTo" header field in the message, Message server 230 then transmits a message (e.g., message 233) to message handler 225 in response to the message request received (e.g., message request 228). In one embodiment of the present invention, message server 230 adds its own unique identifier to the "replyTo" header field of the outgoing message. Message server unique identifier is not necessarily globally unique (as in an Internet Protocol address), but may include identifiers unique to the operating environment of server 220 and message server 230 (e.g., a unique Queue Manager identifier, as used in IBM WebSphere MQ). Moreover, as shown in FIG. 2, message handler 225 communicates with message server 230 (a computing device, as described below) over communications network 250. Communications network 250 may include any network allowing two or more computing devices to communication with each other.

Example communications networks include, but are not limited to, the global Internet, corporate intranets, Ethernet, and other forms of Local Area Networks and Wide Area Networks. The medium of communication between the computing devices in communications network 250 may take various forms that include, but are not limited to, wired communications, wireless communications and satellite communications. In addition, communications network 250 may allow other forms of communication in conjunction with data communications—for example, communications network 250 may include voice communications. In addition, while FIG. 2 illustrates communication network 250 situated between server 220 and message server 230, with server 220 and message server 230 residing on two separate computing devices, such structure is not to be viewed as a limitation on the present invention. Those skilled in the art could easily include both server 220 and message server 230 on a single computing device and without undue experimentation.

Upon receiving the message from message server 230, message handler 225 reads and obfuscates the "replyTo" header field, as filled in by message server 230 to allow communication from client 210 back to message server 230, to create an obfuscated "replyTo" header field. While not shown in FIG. 2, the obfuscating process taken by message handler 225 to obfuscate the "replyTo" header field includes any aliasing process that converts the original "replyTo" header field into an obfuscated "replyTo" header field. For example, any hash algorithm would accomplish this task (such as the MD5 or SHA-1 hash algorithms). Alternatively, the aliasing process used to create the obfuscated "replyTo" header field does not require the computation demands typical of a hash algorithm and a simple enumerator would suffice. In one embodiment of the present invention, such an enumerator would be incremented every time a new message is requested and that enumerated value would constitute the obfuscated "replyTo" header field. Those skilled in the art, however, would recognize that other aliasing processes are possible to create the obfuscated "replyTo" header field could be easily achieved and without undue experimentation.

Message handler 225 then replaces the original "replyTo" header field read from the message with the obfuscated "replyTo" header field. In addition, message handler 225 stores the original "replyTo" header field and the obfuscated "replyTo" header field in database 240. Database 240 may be as simple or as complex as the operating environment demands. For example, in a simple environment, database 240 may be a single file that stores original/obfuscated "replyTo" header field pairs. In more complex environments, however database 240 may include a complete Relational Database Management System (or simply "RDBMS") to store the mapping data. Moreover, as shown in FIG. 2, message handler 225 communicates with database 240 (a computing device, as described below) over communications network 255. Communications network 255 may include any network allowing two or more computing devices to communication with each other. Example communications networks include, but are not limited to, the global Internet, corporate intranets, Ethernet, and other forms of Local Area Networks and Wide Area Networks. The medium of communication between the computing devices in communications network 255 may take various forms that include, but are not limited to, wired communications, wireless communications and satellite communications. In addition, communications network 255 may allow other forms of communication in conjunction with data communications—for example, communications network 255 may include voice communications. In addition, while FIG. 2 illustrates communication network 255 situated between server 220 and database 240, with server 220 and database 240 residing on two separate computing devices, such structure is not to be viewed as a limitation on the present invention. Those skilled in the art could easily include both server 220 and database 240 on a single computing device and without undue experimentation.

Finally, message 243 is transmitted over communications network 245 to client 210 from server 220. Message 243 contains the obfuscated "replyTo" header field calculated above. When client 210 transmits a reply message to message 243 to message server 230 (as described, for example, in FIG. 3), client 210 will use the value in the "replyTo" header field to send a reply message to message server 230.

Figure 3:
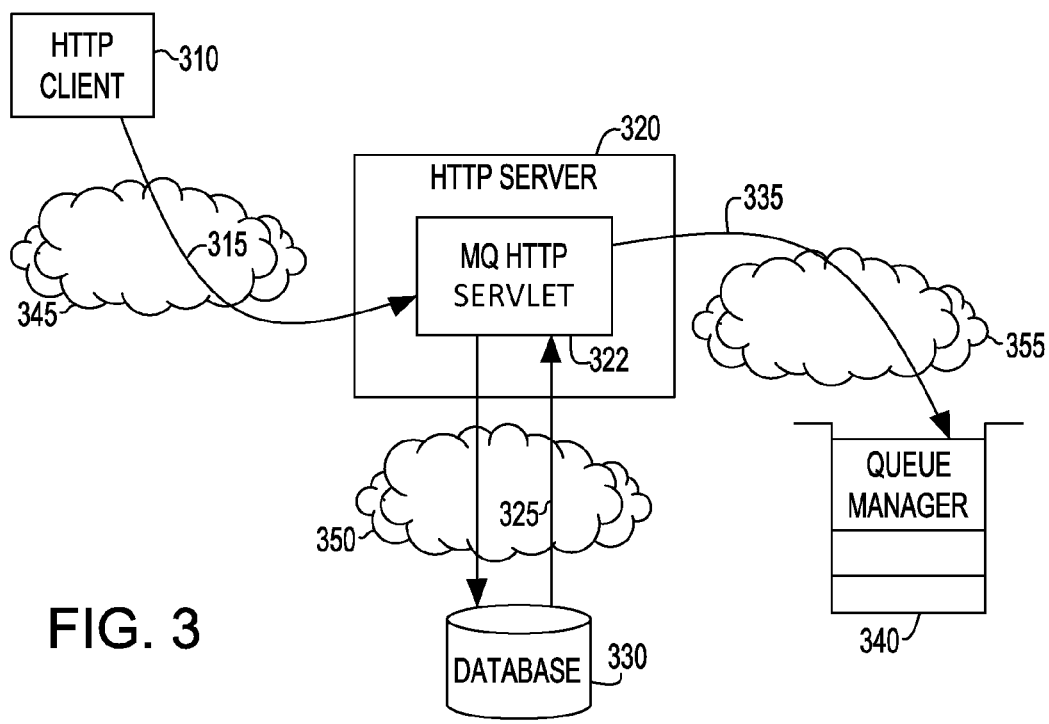
FIG. 3 is a schematic diagram of sending a reply message, according to one embodiment of the present invention.

FIG. 3 illustrates a client sending a reply message to the obfuscated "replyTo" header field in a message, according to one embodiment of the present invention. In FIG. 3, client 310 has already received a message with an obfuscated "replyTo" header field (e.g., similar to what is described above in FIG. 2). Client 310 subsequently formats message 315 to send to message server 340 (e.g., a QM), where the destination identifier is copied from the obfuscated "replyTo" header field (i.e., message 315 contains an obfuscated destination identifier). As with FIG. 2, message 315 can be in any format supporting message-based communications (e.g., IBM WebSphere MQ). As describe above for FIG. 2, client 310 may be any type of computing device adapted to communicate over a communications network. For example, client 310 may be an HTTP client, using the HTTP protocol to transmit message 315 to message server 340, via server 320, an HTTP server. As illustrated in FIG. 3, the request from client 310 to server 320 is communicated over communications network 345. Communications network 345 may include any network allowing two or more computing devices to communication with each other. Example communications networks include, but are not limited to, the global Internet, corporate intranets, Ethernet, and other forms of Local Area Networks and Wide Area Networks. The medium of communication between the computing devices in communications network 345 may take various forms that include, but are not limited to, wired communications, wireless communications and satellite communications. In addition, communications network 345 may allow other forms of communication in conjunction with data communications—for example, communications network 345 may include voice communications.

Once message 315 is received by server 320, message 315 is passed to message handler 322 to determine the valid destination identifier from the obfuscated destination identifier. Consequently, message handler 322 sends request 325 to database 330 to obtain the valid destination identifier from the obfuscated destination identifier. Included in request 325 is the obfuscated destination identifier copied from message 315. As described above for FIG. 2, database 330 may be as simple or as complex as the operating environment demands. For example, in a simple environment, database 330 may be a single file that stores original/obfuscated "replyTo" header field pairs. In more complex environments, database 330 may include a complete RDBMS to store the mapping data. Moreover, as shown in FIG. 3, message handler 322 communicates with database 330 (a computing device, as described below) over communications network 350. Communications network 350 may include any network allowing two or more computing devices to communication with each other. Example communications networks include, but are not limited to, the global Internet, corporate intranets, Ethernet, and other forms of Local Area Networks and Wide Area Networks. The medium of communication between the comput-ing devices in communications network 350 may take various forms that include, but are not limited to, wired communications, wireless communications and satellite communications. In addition, communications network 350 may allow other forms of communication in conjunction with data communications—for example, communications network 350 may include voice communications. In addition, while FIG. 3 illustrates communication network 350 situated between server 320 and database 330, with server 320 and database 330 residing on two separate computing devices, such structure is not to be viewed as a limitation on the present invention. Those skilled in the art could easily include both server 320 and database 330 on a single computing device and without undue experimentation.

Upon retrieving the valid destination identifier from Message 315, sent by client 310, message handler 322 replaces the obfuscated destination identifier from valid destination identifier obtained from database 330. Message Handler 322 uses the valid destination identifier to route to the appropriate destination. The resultant message, message 335, is transmitted to message server 340 identified by the destination identifier for further processing, where message server 340 takes the contents (or "payload") of message 335 (as originally transmitted by client 315) to process (e.g., according to predetermined business logic). As shown in FIG. 3, message handler 322 communicates with message server 340 over communications network 355. Communications network 355 may include any network allowing two or more computing devices to communication with each other. Example communications networks include, but are not limited to, the global Internet, corporate intranets, Ethernet, and other forms of Local Area Networks and Wide Area Networks. The medium of communication between the computing devices in communications network 355 may take various forms that include, but are not limited to, wired communications, wireless communications and satellite communications. In addition, communications network 355 may allow other forms of communication in conjunction with data communications—for example, communications network 355 may include voice communications. In addition, while FIG. 3 illustrates communication network 355 situated between server 320 and message server 340, with server 320 and message server 340 residing on two separate computing devices, such structure is not to be viewed as a limitation on the present invention. Those skilled in the art could easily include both server 320 and message server 340 on a single computing device and without undue experimentation.

Figure 4:
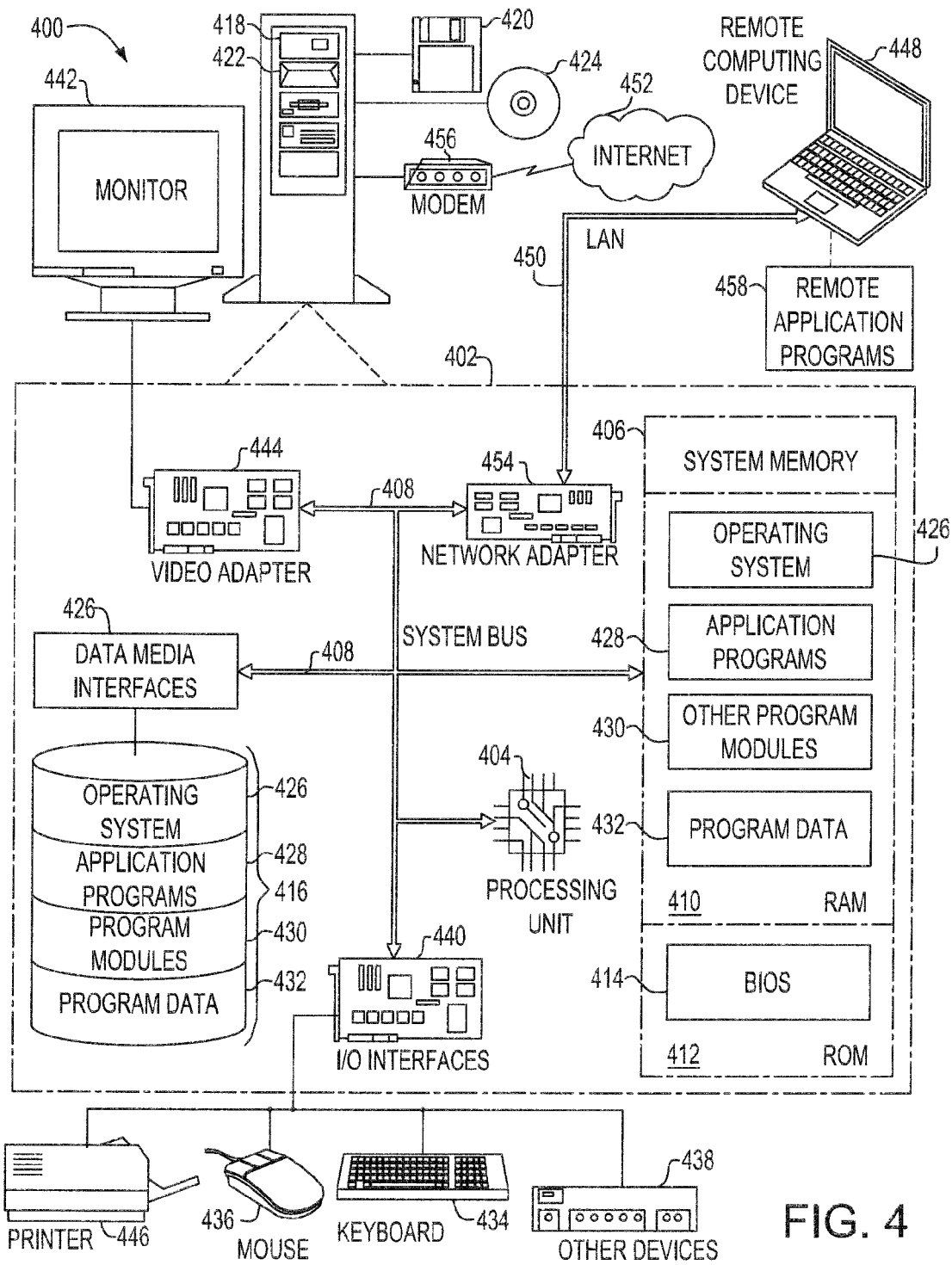
FIG. 4 is a schematic diagram of a computing device, according to one embodiment of the present invention.

FIG. 4 illustrates a general computer environment 400 that can be used to implement the process of message destination obfuscation described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Both the LAN and WAN form logical connections via wired communication mediums and appropriate communication protocols (such as Ethernet, see e.g., IEEE 802.3-1998 Std) or wireless communication mediums and appropriate communications protocols (such as Wi-Fi, see e.g., IEEE 802.11-2007 Std). Such networking environments are commonplace in homes, offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A computer-implemented method of managing message exchanges between a server device of a plurality of server devices and a client device over a communications network in accordance with a Hyper-Text Transmission Protocol (HTTP) communications protocol, said method comprising:

receiving, at an HTTP bridge device operating at a second server device of said plurality of server devices, a first message transmitted from a first server device to the second server device over the communications network, where the first message includes a unique first identifier identifying a queue manager and a queue name associated with a third of said plurality of server devices to receive a reply message from the client device;

substituting, at the HTTP bridge device, the queue name and queue manager name of said first identifier with a unique second identifier that avoids exposing queue manager name to the client in the first identifier, in the first message and providing the first message to the client device;

subsequently receiving, at said HTTP bridge device, a second message from the client device, transmitted to the second server device over the communications network, where the second message includes the second identifier; and substituting, at the HTTP bridge device, the unique second identifier with the queue name and queue manager device of the first identifier and providing the second message to the queue manager device of the third server device via the HTTP bridge device.

2. The method according to claim 1, wherein said substituting applies a hash function to the unique first identifier to produce the unique second identifier.

3. The method according to claim 2, further comprising storing the first identifier and second identifier in a hash table.

4. The method according to claim 1, wherein the message includes a message-oriented middleware message.

5. The method according to claim 1, wherein the first message includes a replyTo header having the first identifier.

6. A non-transitory computer-readable medium embodying computer-readable instructions, that when executed adapt a computing device to perform a method of managing message exchanges between a server device of a plurality of server devices and a client device over a communications network in accordance with a Hyper-Text Transmission Protocol (HTTP) communications protocol, said method comprising:

receiving, at an HTTP bridge device operating at a second server device of said plurality of server devices, a first message transmitted from a first server device to the second server device over the communications network, where the first message includes a unique first identifier identifying a queue manager and a queue name associated with a third of said plurality of server devices to receive a reply message from the client device;

substituting, at the HTTP bridge device, the queue name and queue manager name of said first identifier with a unique second identifier that avoids exposing queue manager name to said client in the first identifier, in the first message and providing the first message to the client device;

subsequently receiving, at said HTTP bridge device, a second message from the client device, transmitted to the second server device over the communications network, where the second message includes the unique second identifier; and substituting, at the HTTP bridge device, the unique second identifier with the queue name and queue manager device of the first identifier and providing the second message to the queue manager device of the third server device via the HTTP bridge device.

7. The non-transitory computer-readable medium according to claim 6, wherein the first computing device applies a hash function to the unique first identifier to produce the unique second identifier.

8. The non-transitory computer-readable medium according to claim 7, further comprising storing, by the first computing device, the unique first identifier and the unique second identifier in a hash table.

9. The non-transitory computer-readable medium according to claim 6, wherein the first message includes a message-oriented middleware message.

10. The non-transitory computer-readable medium according to claim 6, wherein the first message includes a replyTo header recognized by said client device as providing a queue name for responding with said second message.

11. A system of managing message exchanges, comprising:
   a communications network connecting a plurality of computing devices;
   a plurality of server computing device connected to the communications network and adapted to send and receive messages;
   a client device connected to the communications network and adapted to send and receive messages from a first server device of said plurality of server devices;
   an HTTP bridge device at a second server device of said plurality of server devices connected to the communications network and including:
   a means for receiving a first message transmitted from a first server device to the second server device over the communications network, wherein the first message includes a unique first identifier identifying a queue manager and a queue name associated with a third of said plurality of server devices to receive a reply message from the client device;
   a means for substituting the queue name and queue manager name of said first identifier with a unique second identifier that avoids exposing queue manager name to said client in the first identifier, in the first message and providing the first message to the client device;
   said receiving means subsequently receiving a second message from the client device, transmitted to the second server device over the communications network, wherein the unique second message includes the unique second identifier;
   said substituting means substituting the unique second identifier with the queue name and queue manager device of the unique first identifier and providing the second message to the queue manager device of the third server device.

12. The system according to claim 11, wherein the HTTP bridge device applies a hash function to the unique first identifier to produce the unique second identifier.

13. The system according to claim 12, further comprising storing, by the HTTP bridge device, the unique first identifier and the unique second identifier in a hash table.

14. The system according to claim 11, wherein the message includes a message-oriented middleware message.

15. The system according to claim 11, wherein the message includes a replyTo header and at least one of the unique first identifier and the unique second identifier are included in the reply To header.

* * * * *